US005766327A

United States Patent [19]
Maze

[11] Patent Number: 5,766,327
[45] Date of Patent: Jun. 16, 1998

[54] INK COMPOSITIONS HAVING SUPERIOR DECAP AND DRY-TIME PERFORMANCE

[75] Inventor: Robert Craig Maze, Corvallis, Oreg.

[73] Assignee: Hewlett-Packard Company, Palo Alto, Calif.

[21] Appl. No.: 692,977

[22] Filed: Aug. 5, 1996

[51] Int. Cl.$^6$ .................................................. C09D 11/02
[52] U.S. Cl. ................................... 106/31.58; 106/31.86; 106/31.59
[58] Field of Search ........................... 106/31.58, 31.57, 106/31.86, 31.87, 31.59

[56] References Cited

U.S. PATENT DOCUMENTS

| | | | |
|---|---|---|---|
| 4,545,818 | 10/1985 | Inoue et al. | 106/31.58 |
| 4,963,189 | 10/1990 | Hindagolla | 106/31.52 |
| 5,006,172 | 4/1991 | Chieng et al. | 106/31.57 |
| 5,062,893 | 11/1991 | Adamic et al. | 106/31.52 |
| 5,108,503 | 4/1992 | Hindagolla et al. | 106/31.49 |
| 5,141,556 | 8/1992 | Matrick | 106/31.58 |
| 5,188,664 | 2/1993 | Adamic et al. | 106/31.52 |
| 5,342,439 | 8/1994 | Lauw | 106/31.43 |
| 5,389,132 | 2/1995 | Davulcu et al. | 106/31.86 |
| 5,431,724 | 7/1995 | Adamic et al. | 106/31.57 |

*Primary Examiner*—Helene Klemanski

[57] ABSTRACT

Ink compositions that are particularly suitable for, but are not limited to, color, thermal ink-jet printing on various print media are described. The ink compositions of the present invention provide superior decap performance and decreased image drying time without sacrificing other, important ink composition characteristics. One embodiment of an ink composition according to the present invention comprises, by weight, from about 0.5 to about 20 percent water-soluble dye, and from about 5 to about 30 percent of an organic solvent comprising a branched, lower alkyl compound having terminal hydroxyl groups, with the balance being mostly water. Currently, the best results appear to be achieved when the organic solvent is a 1,3-propanediol having a lower alkyl group at the two position, such as 2-methyl-1,3-propanediol, or a mixture of a 1,3-propanediol having a lower alkyl group at the two position and a butanediol, such as 1,4-butanediol. Other components commonly found in ink-jet ink compositions, such as biocides, surfactants and pH buffers, may be added to the ink compositions of the present invention.

10 Claims, No Drawings

INK COMPOSITIONS HAVING SUPERIOR DECAP AND DRY-TIME PERFORMANCE

FIELD OF THE INVENTION

The present invention concerns ink compositions.

BACKGROUND OF THE INVENTION

Ink-jet printers have become established as reliable and efficient printing devices. Typically, an ink-jet printer utilizes a pen mounted on a carriage which is moved relative to the surface of a printing medium. Such pens include print heads with orifice plates. The orifice plates have very small nozzles through which ink droplets are ejected. Small droplets of ink are formed and ejected from the pen through the nozzles and toward the medium. Adjacent to the nozzles are ink chambers where ink is stored prior to ejection. Ink is delivered to the ink chambers through ink channels that are in fluid communication with an ink supply. The ink supply may be, for example, contained in a reservoir section of the pen or supplied to the pen from a remote site.

Ink droplets are ejected through the nozzle by quickly heating a volume of ink within the ink chamber. This causes ink within the chamber to superheat and form a vapor bubble. The rapid expansion of ink vapor forces a drop of ink through the print head nozzles. Ink in the chamber may be heated, for example, with a resistor that is responsive to a control signal.

Research has been conducted to produce new and effective ink products for ink-jet printers. Recently, research in thermal ink-jet printing has concerned developing ink compositions that provide superior print head decap performance, ink dry-times and image quality for images printed on transparent media. Ink composition decap performance refers to the quality of a printed image that is formed after a print head sits uncapped for a period of time. Decap performance generally comprises a measure of nozzle crusting or clogging, which may be caused by evaporation of the ink composition. Decap performance also includes measurement of ink droplet formation and trajectory, both of which may be adversely affected by evaporation of the ink composition.

Specifically, the print head nozzles are exposed to air when the pen is uncapped. This allows the more volatile components of the ink composition to evaporate. Evaporation of water or other ink components of the ink composition may cause dyes to precipitate in the print head nozzles. This forms a crust which blocks or clogs the nozzles. Clogged nozzles lead to partial or total misfire of ink droplets. Tight nozzle tolerances (typically 10–50 µm diameter) require that the ink not clog the nozzles.

Additionally, evaporation of one or more of the components of the ink composition can change the viscosity of the remaining composition. Print quality is negatively affected as the viscosity of the ink increases. For example, the pen may fire smaller ink droplets, poorly formed or shaped droplets and/or inaccurately place droplets on the print medium.

Evaporation of ink components also can lead to improper concentrations of specific ink composition components. This often causes a loss of bleed control between different ink colors. Color bleed is defined as the undesirable intermixing of two different colors when the colors are printed immediately adjacent to each other. A significant level of color bleed causes the border between the two colors to appear ragged and undefined.

It also is important in thermal ink-jet printing to develop ink compositions that reduce print-image drying time. Image drying time, the period the ink is moist after it is ejected onto the print medium, is an important ink composition characteristic. In general, a shorter drying time results in sharper images and allows faster print speeds. The longer an ink dot takes to dry the greater the chances that the dot will smear, will bleed into an adjacent color ink or will wick into the fibers of the print media. Ink composition dry time is especially important when printing on polymeric material, such as gelatin-coated transparency films where dry time is slower than on paper.

Still another important characteristic of ink compositions is the quality of images printed on transparent media. Image quality refers to the quality of printed images in relation to particular print media and/or printer users.

Inks are known that possess one or more of the foregoing properties and other important ink composition characteristics. Few inks possess all of the desired properties since any improvement in one property often results in the degradation of another property. Moreover, ink compositions developed for printing on a variety of media require additional special properties. Accordingly, research continues towards developing ink compositions which have improved decap performance, reduced drying time, and improved image-forming characteristics. It also is important that any performance improvements do not occur at the expense of other desired ink composition characteristics.

SUMMARY OF THE INVENTION

The present invention provides ink compositions that are particularly suitable for, but are not limited to, color ink-jet printing on various print media. The ink compositions of the present invention provide superior decap performance and decreased image drying time without sacrificing other, important ink composition characteristics.

One embodiment of an ink composition according to the present invention comprises, by weight, from about 0.5 to about 20 percent water-soluble dye, from about 5 to about 30 percent of an organic solvent comprising a branched, lower alkyl compound having terminal hydroxyl groups, with the balance being mostly water.

Currently, the best results appear to be achieved when the organic solvent is a 1,3-propanediol having a lower alkyl group at the two position, such as 2-methyl-1,3-propanediol, or a mixture of a 1,3-propanediol having a lower alkyl group at the two position and a butanediol, such as 1,4-butanediol. Thus, a currently preferred ink composition comprises, by weight, from about 10 to about 20 percent, more typically about 15 percent, 2-methyl-1,3-propanediol, and from 0.1 to about 10 percent, and more typically about 5 percent, 1,4-butanediol as the organic solvents. Other components commonly found in ink-jet ink compositions, such as biocides, surfactants and pH buffers, also may be added to the ink compositions of the present invention.

DETAILED DESCRIPTION OF THE PREFERRED EMBODIMENTS

The present invention concerns ink compositions for use preferably, but not necessarily, with thermal ink-jet printers. The specially formulated ink compositions avoid print quality problems associated with poor decap performance (e.g., nozzle crusting, poor ink-drop trajectory) and slow ink drying time (e.g., bleed, smearing).

The ink compositions of the present invention may be used to print images on a wide variety of materials, which are referred to herein as "print media," "media" or "substrates," including ordinary cellulosic paper and other substrates such as fibrous and resinous sheets. Film materials, non-porous transparent polyester films and similar materials which are difficult to mark also can be used as print media for the present ink compositions. The ink compositions of the present invention are especially well-suited for printing images on cellulose acetate, mylar and gelatin-coated transparency films.

I. Ink Compositions

Working embodiments of the ink compositions comprise, by weight (all percents stated herein are by weight unless indicated otherwise), from about 0.5 to about 20 percent water-soluble dye, and from about 5 to about 30 percent organic solvent comprising a branched, lower alkyl diol. As used herein, the term "branched" indicates that at least one of the carbon atoms forming the carbon chain of the diol compound has attached thereto another carbon atom (such as a methyl group) or a carbon chain. The purity of all components used in the present ink compositions is that employed in normal commercial practice for forming ink compositions, particularly those ink compositions developed for thermal ink-jet printers. The lower alkyl diol generally, but not necessarily, includes terminal hydroxyl or sulfhydryl groups. "Terminal," as used herein, refers to groups that are attached to the terminal carbons in a carbon chain, with preferred compounds having either hydroxyl groups, sulfhydryl groups, or a hydroxyl and a sulfhydryl group, attached to carbon atoms positioned on opposing ends of the carbon base chain. The balance of the ink compositions are mostly water.

Good results are achieved when the ink compositions include about 15 percent to about 25 percent by weight of the branched, lower alkyl diol, such as 2-methyl-1,3-propanediol. Excellent results are achieved when the lower alkyl diol organic solvent comprises about 20 percent by weight. Best results currently appear to be achieved when the organic solvent comprises from about 10 to about 20 percent by weight 2-methyl-1,3-propanediol, with excellent results achieved when the 2-methyl-1,3-propanediol is present in an amount of about 20 percent by weight. Other components commonly found in ink compositions, such as biocides, surfactants and pH buffers, and any other compounds now known or hereafter discovered that are useful for forming ink compositions, also may be used.

II. Ink Composition Materials

1. Dyes

In order to produce ink compositions in accordance with the present invention, one or more dyes are first selected. A wide range of useful dyes are available; the dye may be water-soluble, black or colored dyes. The term "water-soluble dye," as used herein, refers to dyes whose solubility limit in water is sufficiently high so as to produce desired color saturation of printed images. Generally, a solubility limit in water exceeding 2 percent by weight will meet most desired color saturation goals. A "water-insoluble dye" is a dye which evidences no appreciable dissolution of the dye in water at room temperature.

Water-soluble dyes are the preferred class of dyes for forming the ink compositions of the present invention. Suitable water-soluble dyes include, but are not limited to, the following dyes: Acid Red 52, Acid Red 289, Acid Red 27, Reactive Red 180, Direct Red 227, Basic Red 3, Acid Yellow 23, Direct Yellow 86, Basic Yellow 9, Basic Yellow 11, Acid Blue 9, Basic Blue 9, Direct Blue 199, Process Reactive Black 31 and mixtures thereof.

Water-insoluble dyes may be suitable for use with the present ink compositions. Such dyes include, without limitation, solvent dyes, vat dyes and certain mordant dyes. These dyes are available in a variety of blacks and colors. Examples, without limitation, of water-insoluble solvent dyes include Solvent Black (SB) 3 SB5, SB46, SB48, Solvent Blue 36, Solvent Blue 59, Solvent Red 1, Solvent Red 24, Solvent Red 68, Solvent Yellow (SY) 13, SY14, SY33, and SY93. Examples, without limitation, of suitable vat dyes include Vat Black 9, Vat Black 25, Vat Blue 1, Vat Blue 6, Vat Red 10, Vat Yellow 4, and mixtures thereof.

Examples of water-insoluble mordant dyes include, without limitation, Mordant Black 1, Mordant Black 9, Neazopond Black X52 available from BASF Corp., Chemical Division (Holland, Mich.), Mordant Blue 1, Mordant Red 7, Mordant Red 9, Mordant Yellow 26, and mixtures thereof.

The dyes discussed above often include counter-ions for charge balance. Anionic water-soluble dyes, such as Acid Red 27, typically have sodium counter-ions. However, the counter-ion also may be $K^+$, $Li^+$ and $NH^+_4$. For Acid Yellow 23 and Direct Blue 199, tetramethyl ammonium [$(CH_3)_4N^+$, TMA] counter-ion is preferred because this counter-ion apparently further reduces nozzle crusting. Cationic water-soluble dyes, such as Basic Yellow 1, typically include counter-ions such as, $Cl^-$, $Br^-$, $ZnCl_4^{2-}$, and $NO_3^-$.

The particular dyes discussed are intended to be illustrative only. It should be understood that any dye, now known or hereinafter developed, can be used to practice the invention, as long as such dye has suitable characteristics. Suitable characteristics include good hue, high chroma, acceptable photofade characteristics, sufficiently high optical densities, sufficient solubilities in the fluid acting as the ink vehicle (preferably water for the present invention), good saturation and crusting performance. Moreover, suitable dyes do not detract from the use of the ink composition for the production of thermal ink-jet printed images.

The ink compositions preferably contain from about 0.5 to about 20 percent, and more preferably from about 1 to about 10 percent by weight of the dye, or mixtures of dyes, based on the total weight of the ink composition.

2. Organic Solvents

In accord with the present invention, one or more organic solvents are used to prepare ink compositions that provide superior decap performance and image-forming characteristics, as well as reduced ink drying time properties. Best results are achieved when the organic solvent comprises compounds represented by Formula 1:

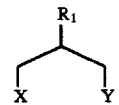

FORMULA 1 wherein $R_1$ is selected from the group consisting of hydrogen and lower alkyl groups and X and Y are independently selected from the group consisting of hydroxyl (—OH) and sulfhydryl (—SH). As used herein, the term "lower alkyl" refers to compounds having ten or fewer carbon atoms, and more typically refers to compounds having from about 1 to about 5 carbon atoms, and also includes branched alkyl groups, alkyl groups having sites of unsaturation, such as alkenes and alkynes, and further including all stereoisomers. Particularly preferred lower alkyl groups are methyl and ethyl. Working embodiments of the ink compositions may include an organic solvent wherein X and Y both are terminal hydroxyl groups, and wherein $R_1$ is a methyl or ethyl group.

In working embodiments of the ink compositions, the organic solvent comprising compounds according to Formula (1) are present in the ink composition in amounts of from about 5 percent to about 30 percent by weight, with a range of from about 15 percent to about 25 percent by weight yielding especially good results. Excellent decap performance and drying time results are achieved when the organic solvent is present in the ink composition in an amount of about 20 percent by weight. Best results currently appear to be achieved when the organic solvent comprises 2-methyl-1,3-propanediol present in the ink composition in an amount of about 20 percent by weight.

Another embodiment of the present invention includes mixing organic solvents, the mixture comprising one or more compounds according to Formula 1 with a second organic solvent. The second organic solvent may comprise any water-soluble diol, but preferably is selected from the group consisting of hexanediol, pentanediol, butanediol, pyrrolidone, 2-pyrrolidone, diethylene glycol, including mixtures and isomers thereof.

Preferably the organic solvent according to Formula 1, when mixed with one or more additional organic solvents, is present in the ink compositions of the present invention in amounts ranging from about 10 percent to about 20 percent, by weight, with one or more of the second organic solvents being present in amounts ranging from about 0.1 percent to about 10 percent. Best results are achieved, when the ink compositions comprise a mixture of organic solvents, when the organic solvent according to Formula (1) is present in the ink compositions in an amount of about 15 percent by weight with one or more of the second organic solvents being present in an amount of about 5 percent by weight. When two or more organic solvents are used in a single ink composition, the organic solvent according to Formula 1 preferably is 2-methyl-1,3-propanediol and the second organic solvent preferably is a butanediol, such as 1,4-butanediol.

3. Surfactants

About 0.1 percent to about 5 percent, and preferably from about 0.1 percent to about 2 percent, by weight, of one or more surfactants may be added to the ink compositions of the present invention. Such surfactants provide bleed control, promote uniform ink coverage and leveling of ink on the print media, produce a higher image quality, and retard ink evaporation. Surfactants may also shorten ink image drying time by causing the ink to penetrate into the print media. Examples of suitable surfactants include, but are not limited to: alkyl polyethylene oxides available from Union Carbide under the tradename TERGITOL, TERGITOL 15-S-5 and TERGITOL 15-S-7; nonyl phenyl polyethylene oxides, which are also available from Union Carbide under the tradename TRITON and TRITON GR-5M; silicones such as SILWET L-77 and SILWET-L707, which are available from Union Carbide; AEROSOL OT, which is available from American Cyanamid; hydroxylated or alkoxylated acetylenic polyethylene oxides, such as SURFYNOL 465, which are available from Air Products and Chemicals; ammonium alcohol ethoxylate sulfates according to Formula 2:

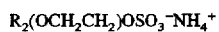  Formula 2 wherein $R_2$ is a fatty alkyl or alkylaryl group, which compounds are available from Rhone-Poulenc, Inc., under the tradename RHODAPEX CD-128; ammonium nonoxynol-4 sulfates, which are available under the tradenames RHODAPEX CO-433 and RHODAPEX CO-436; and polysaccharides having a molecular weight of from about 12,000 to 80,000 and a typical degree of polymerization range of about 60 to 400, such as sodium alginate.

4. pH Buffers

As the pH of an ink composition is lowered, there is a tendency for the ink to clog the nozzles or cause bronzing. Ink bronzing generally refers to a tendency of black ink on paper to turn a reddish-brown color upon drying. Stabilizing the pH in an operating range of from about 7 to about 9.5 may be achieved in the ink compositions of the present invention by the addition of pH buffers. However, ink compositions having pH values less than 7 may also be suitable for use in the present invention. For pH ranges from about 7 to about 9.5, one or more buffers at a concentration of from about 0.1 percent to about 5 percent, by weight are suitable. The buffers preferably have pKa's ranging from about 6.5 to 10. Buffers such as TES (N-tris[hydroxymethyl]-methyl-2-aminoethanesulfonic acid), BICINE (N,N-bis[2-hydroxyethyl]glycine), TEA (triethanolamine), TRIS (tris[hydroxymethyl]-aminomethane), and BORAX (sodium borate decahydrate) may be used alone, in combination with each other or in combination with other buffers.

5. Biocides

Biocides in amounts ranging from about 0.1 percent to about 0.5 percent by weight also may be used in formulating the ink composition of the present invention. Examples of suitable biocides include, but are not limited to, PROXEL CRL and PROXEL GXL (available from ICI, Great Britain), and NUOSEPT C and NUOSEPT 95 (available from Nuodex, Inc., Piscataway, N.J.).

III. Examples

In order to further illustrate the invention, some practical illustrations are set forth. These examples are illustrative only and in no way are to be construed to limit the invention to the particular features described.

Example 1

Several different cellulosic media and overhead transparency films were printed using a Hewlett-Packard thermal ink-jet pen. The ink composition used had the following aqueous composition:

| COMPOUND | PERCENT BY WEIGHT |
|---|---|
| 2-Methyl-1,3-Propanediol | 15 |
| 1,4-Butanediol | 5 |
| Tergitol 15-S-5 | 0.5 |
| Triton GR-5M | 1.5 |
| Direct Blue (DB) 199 | 0.5–5 |

Decap performance and printed-image drying time of the ink composition were measured by scoring the image quality of print samples. The image quality scores are obtained by sending the printed image samples to a committee of at least seven people who score the images by qualitatively measuring the image against internal standards and assigning a score to the image sample based on a ten point scale. The scores for each sample are then averaged. A score of 5 or more is required for acceptability. The ink composition above received an image-quality score of from about 5.8 to about 6.2.

Decap performance may also be tested as follows. Using the ink composition under examination ten ink droplets are fired from a thermal ink-jet printer. The droplets are fired periodically, in a pattern of equally spaced 5 mm solid ink fill bars for an extended period of time. The first occurrence of misfired droplet is indicative of "decap time," nozzle crusting or the point of an unacceptable rate of ink composition evaporation. The longer the time required for this to occur, the better the decap performance and ink drying time characteristics of the ink composition.

Decap performance and ink drying time results for the above described ink composition were superior. The ink composition produced no color/color or black/color bleed and sharp, clear characters were obtained. Bleed characteristics also were measured by the above-described image quality scoring method. Ink-jet pens utilizing this ink composition required fewer operator interventions and printed more pages than when using previous ink compositions for substantially similar applications. The decrease in the need for operator intervention is directly related to decap performance in that inferior decap performance requires more frequent operator intervention due, at least in part, to ink composition evaporation.

Example 2

Several different cellulosic media and overhead transparency films were printed with a Hewlett-Packard DeskJet 850C thermal ink-jet pen (DeskJet is a trademark of Hewlett-Packard Company) using an aqueous ink composition having the following aqueous composition:

| COMPOUND | PERCENT BY WEIGHT |
| --- | --- |
| 2-Methyl-1,3-Propanediol | 8 |
| RHODAPEX CD-128 | 4 |

Decap performance, ink composition drying time and bleed were measured according to one or both of the above-described methods. Decap performance and drying time were satisfactory as was black/color bleed.

Example 3

Several different cellulosic media and overhead transparency films were printed using a Hewlett-Packard DeskJet 850C thermal ink-jet pen, with an ink droplet volume of 36 pL, using an ink composition having the following aqueous composition:

| COMPOUND | PERCENT BY WEIGHT |
| --- | --- |
| 2-Methyl-1,3-Propanediol | 20 |
| RHODAPEX CD-128 | 4 |
| DB199 | 0.5–5 |

Decap performance, ink composition drying time and bleed were measured according to one or both of the above-described methods. Decap performance and drying time were superior. Printed images were sharp and clear and exhibited no color/color bleed or composite black/color bleed.

Example 4

Several different cellulosic media and overhead transparency films were printed with a Hewlett-Packard DeskJet 850C thermal ink-jet pen using an ink composition having the following aqueous composition:

| COMPOUND | PERCENT BY WEIGHT |
| --- | --- |
| 2-Methyl-1,3-Propanediol | 20 |
| RHODAPEX CD-128 | 4 |
| Sodium Alginate (low viscosity*) | 0.3 |
| AB9, DB199, AY23, RR180, and AR52 | 0.5–5 |

*viscosity 60 to 500 centipoise

Decap performance, ink composition drying time and bleed were measured according to one or both of the above-described methods. Results were superior in text print quality, excellent decap performance and drying time, with no color/color or black/color bleed.

Example 5

Overhead transparency films were printed with a Hewlett-Packard DeskJet 850C thermal ink-jet pen using an ink composition having the following aqueous composition:

| COMPOUND | PERCENT BY WEIGHT |
| --- | --- |
| 2-Methyl-1,3-Propanediol | 20 |
| RHODAPEX CD-128 | 4 |
| Magnesium Nitrate Hexahydrate | 4.5 |
| AB9 | 0.28* |
| DB199 | 0.16* |
| AY23 | 0.16* |
| RR180 | 0.14* |
| AR52 | 0.10* |

*absorbance units, measured utilizing Hewlett-Packard UV/VIS II 8452A Spectrometer.

Decap performance and bleed of this ink composition were measured according to one or both of the above-described methods. The ink composition of this example resulted in satisfactory print quality, decap performance, with little color/color and black/color bleed.

Example 6

Gilbert Bond Paper media were printed upon using a Hewlett-Packard 850C thermal ink-jet pen using an ink composition having the following aqueous composition:

| COMPOUND | PERCENT |
| --- | --- |
| 2-Methyl-1,3-Propanediol | 11 molal |
| 2-Pyrrolidone | 9 molal |
| RHODAPEX CD-128 | 4 weight |
| Magnesium Nitrate Hexahydrate | 4.5 weight |
| AB9 | 0.28* |
| DB199 | 0.16* |
| RR180 | 0.14* |
| AR52 | 0.10* |

*absorbance units, measured utilizing a Hewlett-Packard UV/VIS II 8452A Spectrometer.

Decap performance was measured according to one or both of the above-described methods. Results illustrated superior decap performance for color dyes.

Example 7

Gelatin-coated media were printed using a Hewlett-Packard thermal ink-jet pen using an ink composition having the following aqueous composition:

| COMPOUNDS | PERCENT |
| --- | --- |
| 2-Methyl-1,3-Propanediol | 15 |
| 1,4-Butanediol | 5 |
| TRITON GR-5M | 1.5 |
| TERGITOL 15-S-5 | 0.5 |
| PROXEL GXL | 0.2 |
| Y104 | 0.5–5 |
| M377 | 0.5–5 |
| DB199 (TMA form) | 0.5–5 |
| PRB31 | 0.5–5 |

Ink composition drying time was measured according to one or both of the above-described methods. Results illustrated that the above-described ink composition produced images of acceptable photographic quality on gelatin-coated media.

Having illustrated and described the principles of the invention, it should be apparent to those persons skilled in the art that the illustrated embodiments may be modified without departing from such principles. I claim as our invention all such embodiments that may come within the scope and spirit of the following claims and equivalents thereto.

I claim:

1. An ink composition comprising from about 5 percent to about 30 percent by weight of 2-methyl-1,3-propanediol and about 0.1 to about 10 percent by weight of butanediol.

2. The ink composition according to claim 1 wherein the 2-methyl-1,3-propanediol is present in an amount of from about 5 percent to about 15 percent by weight.

3. The ink composition according to claim 1 further comprising from about 0.5 percent to about 20 percent by weight dye.

4. The ink composition according to claim 1 wherein the butanediol comprises 1,4-butanediol.

5. The ink composition according to claim 1 further comprising a material selected from the group consisting of a buffer in an amount sufficient to provide an ink composition pH of from about 7 to about 9.5, from about 0.1 percent to about 2 percent surfactant by weight, from about 0.1 percent to about 0.5 percent biocide by weight and mixtures thereof.

6. An ink composition for ink jet printers, comprising:
   from about 5 percent to about 30 percent by weight of 2-methyl-1,3-propanediol;
   from about 0.1 percent to about 5 percent by weight of a surfactant comprising an alkyl polyethylene oxide from about 0.1 to about 10 percent by weight of butanediol; and
   from about 0.5 percent to about 20 percent by weight water-soluble dye.

7. The ink composition according to claim 6 wherein the butanediol is 1,4-butanediol.

8. The ink composition according to claim 6 and further comprising a material selected from the group consisting of a buffer in an amount sufficient to provide an ink composition pH of from about 7 to about 9.5, from about 0.1 percent to about 2 percent of the alkyl polythlene oxide by weight, from about 0.1 percent to about 0.5 percent biocide by weight and mixtures thereof.

9. The ink composition according to claim 6 wherein the 2-methyl-1,3-propanediol is present in an amount of about 15 percent by weight, and the butanediol is present in an amount of about 5 percent by weight.

10. The ink composition according to claim 5 wherein the surfactant comprises an alkyl polyethylene oxide.

* * * * *